US009912457B2

(12) United States Patent
Jeong et al.

(10) Patent No.: US 9,912,457 B2
(45) Date of Patent: Mar. 6, 2018

(54) METHOD AND DEVICE FOR TRANSMITTING AND RECEIVING DATA IN WIRELESS COMMUNICATION SYSTEM

(71) Applicant: Samsung Electronics Co., Ltd, Gyeonggi-do (KR)

(72) Inventors: Su-Ryong Jeong, Gyeonggi-do (KR); Jeong-Ho Park, Seoul (KR); Jae-Won Kim, Seoul (KR); Min Sagong, Gyeonggi-do (KR); Hyun-Kyu Yu, Gyeonggi-do (KR); Sung-Nam Hong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 81 days.

(21) Appl. No.: 15/038,436

(22) PCT Filed: Nov. 20, 2014

(86) PCT No.: PCT/KR2014/011186
§ 371 (c)(1),
(2) Date: May 20, 2016

(87) PCT Pub. No.: WO2015/076579
PCT Pub. Date: May 28, 2015

(65) Prior Publication Data
US 2016/0294523 A1 Oct. 6, 2016

(30) Foreign Application Priority Data

Nov. 20, 2013 (KR) .................. 10-2013-0141370

(51) Int. Cl.
*H04L 5/00* (2006.01)
*H04L 1/00* (2006.01)
(Continued)

(52) U.S. Cl.
CPC ......... *H04L 5/0048* (2013.01); *H04B 7/0632* (2013.01); *H04L 1/0026* (2013.01);
(Continued)

(58) Field of Classification Search
CPC ... H04L 5/0048; H04L 27/0008; H04L 5/006; H04L 27/10; H04L 1/0026; H04L 27/34; H04B 7/0632; H04W 72/08
See application file for complete search history.

(56) References Cited

U.S. PATENT DOCUMENTS

2003/0048834 A1 3/2003 Feher
2005/0282500 A1 12/2005 Wang et al.
(Continued)

FOREIGN PATENT DOCUMENTS

KR 10-2005-0039453 4/2005
KR 10-2007-0032695 3/2007
(Continued)

OTHER PUBLICATIONS

International Search Report dated Feb. 25, 2015 in connection with International Application No. PCT/KR2014/011186; 7 pages.

*Primary Examiner* — Mohammad Anwar

(57) ABSTRACT

The present invention relates to a method for transmitting data in a wireless communication system, comprising the steps of: allocating, by a base station, a resource for transmitting data modulated by a hybrid frequency shift keying (FSK) and quadrature amplitude modulation (QAM) (FQAM) scheme in which a QAM scheme and a FSK scheme are combined; transmitting, by the base station, a sequence modulated by the FQAM scheme, to a mobile station, via an interference measurement channel; transmitting, by the base station, a reference signal for measuring channel quality information (CQI) to the mobile station; receiving, by the base station, CQI estimated based on an interference characteristic of the interference measurement channel, from the mobile station, and performing scheduling of the mobile station based on the received CQI; and transmitting, by the base station, the data modulated by the FQAM scheme to the mobile station.

20 Claims, 7 Drawing Sheets

(51) Int. Cl.
　　　*H04L 27/10*　　　(2006.01)
　　　*H04L 27/34*　　　(2006.01)
　　　*H04B 7/06*　　　(2006.01)
　　　*H04W 72/08*　　　(2009.01)
　　　*H04L 27/00*　　　(2006.01)

(52) U.S. Cl.
　　　CPC .......... *H04L 5/006* (2013.01); *H04L 27/0008* (2013.01); *H04L 27/10* (2013.01); *H04L 27/34* (2013.01); *H04W 72/08* (2013.01); *H04L 5/0023* (2013.01)

(56) References Cited

U.S. PATENT DOCUMENTS

| | | | |
|---|---|---|---|
| 2008/0159186 A1* | 7/2008 | Steer | H04L 25/0202 370/297 |
| 2009/0097585 A1 | 4/2009 | Kou et al. | |
| 2011/0205905 A1* | 8/2011 | Kang | H04L 1/0027 370/241 |
| 2013/0039342 A1* | 2/2013 | Kazmi | H04W 48/16 370/331 |
| 2013/0251001 A1 | 9/2013 | Lee et al. | |

FOREIGN PATENT DOCUMENTS

| | | |
|---|---|---|
| KR | 10-2009-0037271 | 4/2009 |
| KR | 10-2012-0060016 | 6/2012 |

\* cited by examiner

METHOD AND DEVICE FOR TRANSMITTING AND RECEIVING DATA IN WIRELESS COMMUNICATION SYSTEM

PRIORITY

This application is a National Phase Entry of PCT International Application No. PCT/KR2014/011186, which was filed on Nov. 20, 2014, and claims a priority to Korean Patent Application No. 10-2013-0141370, which was filed on Nov. 20, 2013, the contents of which are incorporated herein by reference.

TECHNICAL FIELD

The present disclosure relates to a method and device for measuring interference information for data transmission in a wireless communication system.

BACKGROUND

In order to meet a demand for continuously increasing wireless data traffic, technologies for wireless communication system are being developed to improve spectral efficiency and increase channel capacity based on communication technologies, such as Orthogonal Frequency Division Multiplexing (OFDM), Multiple Input Multiple Output (MIMO) transmission/reception, etc.

Also, in order to prevent the entire system performance from being limited by cell-edge users suffering from a low Signal-to-Noise Ratio (SNR) at cell edges distant from a cell center or a low Carrier-to-Interference and Noise Ratio (CINR) due to great interference by base stations of the adjacent cells, Inter-Cell Interference-Coordination (ICIC), Coordinated Multi-Points (CoMP), receiver interference cancellation, etc. have been developed to increase transmission efficiency for such cell-edge users.

The above-mentioned technologies have been studies in view of interference cancellation at transmitting terminals or at receiving terminals, however, improved technology for increasing channel capacity for cell-edge users is fundamentally needed.

Also, typically, interference signals were assumed to follow a Gaussian distribution in order to perform decoding with low complexity, and a Quadrature Amplitude Modulation (QAM)-based modulation method was mainly used to make the characteristics of interference signals maximally close to the Gaussian distribution. However, since the channel capacity of a non-Gaussian channel having different interference components for individual symbols is greater than that of a Gaussian channel, the non-Gaussian channel will be able to ensure higher decoding performance than the Gaussian channel if decoding is appropriately performed. Accordingly, a modulation method for making interference signals have non-Gaussian properties needs to be developed.

Accordingly, an object of the present disclosure is to provide a method and device for measuring interference information for transmitting data in a wireless communication system and transmitting/receiving data using the interference information.

SUMMARY

In accordance with an aspect of exemplary embodiments of the present disclosure, there is provided a method of transmitting data in a wireless communication system, including: allocating, by a base station, a resource for transmitting data modulated by a hybrid frequency shift keying (FSK) and quadrature amplitude modulation (QAM) (FQAM) scheme in which a QAM scheme and a FSK scheme are combined, transmitting, by the base station, a sequence modulated by the FQAM scheme, to a mobile station, via an interference measurement channel, transmitting, by the base station, a reference signal for measuring channel quality information (CQI) to the mobile station, receiving, by the base station, CQI estimated based on an interference characteristic of the interference measurement channel, from the mobile station, and performing scheduling of the mobile station based on the received CQI; and transmitting, by the base station, the data modulated by the FQAM scheme to the mobile station.

In accordance with another aspect of exemplary embodiments of the present disclosure, there is provided a method of receiving data in a wireless communication system, including: receiving, by a mobile station, a sequence modulated by a hybrid frequency shift keying (FSK) and quadrature amplitude modulation (QAM) (FQAM) scheme in which a QAM scheme and a FSK scheme are combined, from a base station, via an interference measurement channel, and measuring an interference characteristic based on the sequence, receiving, by the mobile station, a reference signal for measuring channel quality information (CQI) from the base station, estimating, by the mobile station, CQI based on the measured interference characteristic, and transmitting the estimated CQI to the base station, receiving, by the mobile station, data modulated by the FQAM scheme from the base station.

In accordance with another aspect of exemplary embodiments of the present disclosure, there is provided a device of transmitting data in a wireless communication system, including: a controller configured to control operations of: allocating a resource for transmitting data modulated by a hybrid frequency shift keying (FSK) and quadrature amplitude modulation (QAM) (FQAM) scheme in which a QAM scheme and a FSK scheme are combined; transmitting a sequence modulated by the FQAM scheme to a mobile station, via an interference measurement channel; transmitting a reference signal for measuring channel quality information (CQI) to the mobile station; receiving CQI estimated based on an interference characteristic of the interference measurement channel from the mobile station; performing scheduling of the mobile station based on the received CQI; and transmitting data modulated by the FQAM scheme to the mobile station, and a transceiver configured to transmit the sequence and the reference signal, to receive the CQI from the mobile station, and to transmit the data modulated by the FQAM scheme to the mobile station, under the control of the controller.

In accordance with an aspect of exemplary embodiments of the present disclosure, there is provided a device of receiving data in a wireless communication system, including: a controller configured to control operations of: receiving a sequence modulated by a hybrid frequency shift keying (FSK) and quadrature amplitude modulation (QAM) (FQAM) scheme in which a QAM scheme and a FSK scheme are combined, from a base station, via an interference measurement channel; measuring an interference characteristic based on the sequence; receiving a reference signal for measuring channel quality information (CQI) from the base station; estimating CQI based on the measured interference characteristic; transmitting the estimated CQI to the base station; and receiving data modulated by the FQAM scheme from the base station, and a transceiver configured to receive the reference signal for measuring the CQI from the base station, to transmit the estimated CQI to the base station, and to receive the data modulated by the FQAM scheme from the base station, under the control of the controller.

DETAILED DESCRIPTION

Figure 1:
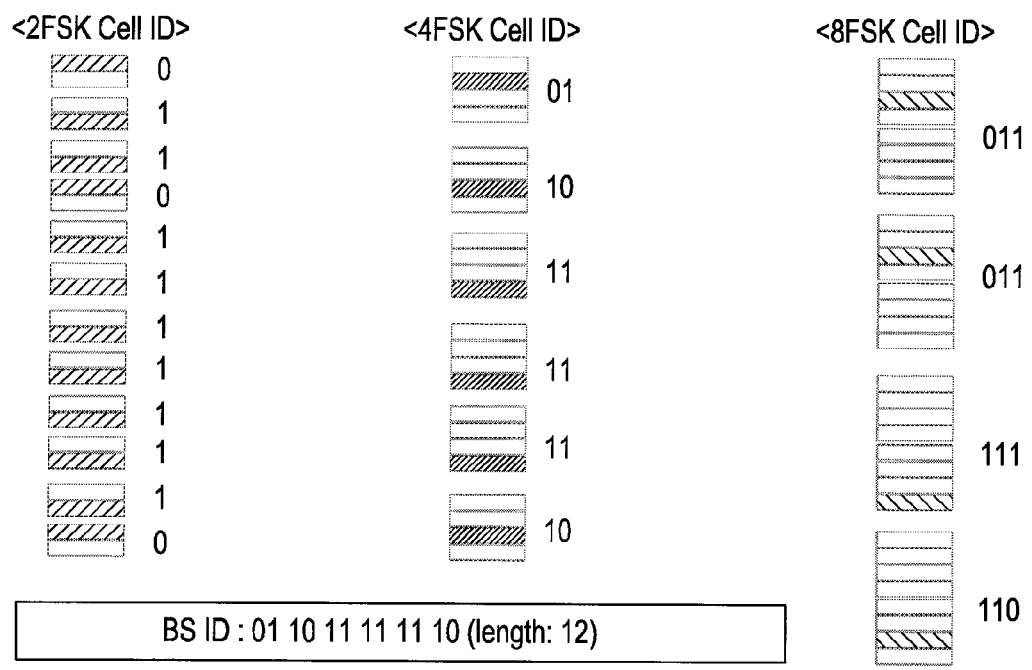
FIG. 1 shows sequence allocation according to an embodiment of the present disclosure.

Hereinafter, the embodiments of the present disclosure will be described in detail with reference to the accompanying drawings. In the following description, if it is determined that detailed descriptions for related, well-known functions or configurations make the subject matter of the present disclosure obscure unnecessarily, the detailed descriptions will be omitted. Also, although terms used in the present disclosure were selected as terminology used in the present disclosure while considering the functions of the present disclosure, they may vary according to a user's or operator's intentions, judicial precedents, and the like. Hence, the terms must be defined based on the contents of the entire specification, not by simply stating the terms themselves.

In the embodiments of the present disclosure, interference measurement for data transmission to which a modulation method (also, called FQAM) in which a Frequency Shift Keying (FSK) method and a Quadrature Amplitude Modulation (QAM) method are combined is applied will be described.

FQAM data transmission is a method of arbitrarily configuring and transmitting interference signals of adjacent base stations in a non-Gaussian form using a characteristic in which the transmission gain of signals increases when the interference signals are non-Gaussian. Accordingly, the FQAM data transmission can perform transmission of a robust signal even at a relatively low Signal to Interference plus Noise Ratio (SINR).

A representative one of methods of decoding data received through such a non-Gaussian interference channel is a Complex Generalized Gaussian (CGG) decoding method. In the CGG decoding method, it is assumed that non-Gaussian interference and noise follow a CGG distribution. A probability density function of the CGG distribution can be expressed as Equation (1), below.

$$f_Z(z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right) \quad (1)$$

In Equation (1), $f_Z$ is a probability density function of noise, z is a variable representing noise, $\alpha$ is a shape parameter representing a degree of non-Gaussian, $\beta$ is a scale parameter representing variance, and $\Gamma$ is a gamma function, wherein $$\Gamma(z) \triangleq \int_0^\infty t^{z-1} \exp(-5) dt.$$

As seen in Equation (1), the probability density function of the CGG distribution follows a Gaussian distribution if $\alpha$ is 2, a Super Gaussian (non-Gaussian) distribution having a heavy tail if $\alpha$ is smaller than 2, and a Sub Gaussian distribution having a light tail if $\alpha$ is greater than 2.

When data is received through the non-Gaussian interference channel, link performance and decoding performance may depend on the $\alpha$ value, that is, a degree of the non-Gaussian interference characteristics. Accordingly, in order to perform link adaptation, a process of measuring information of non-Gaussian interference, as well as Channel Quality Information (CQI), is needed.

A method of measuring the $\alpha$ value can be expressed as Equation (2), below.

$$\hat{\alpha} = \frac{\ln\left(\frac{3^6}{2^{10}}\right)}{\ln\left(\frac{\left(\frac{1}{N_S}\sum |Z[k]|\right)^2}{\frac{1}{N_S}\sum |Z[k]|^2} - \frac{\pi}{4} + \frac{3^2}{2^{3.5}} + \ln\left(\frac{3}{2\sqrt{2}}\right)\right)} \quad (2)$$

As described above in Equation (1), $\alpha$ defined in Equation (2) is a metric resulting from digitizing a degree of non-Gaussian of interference and noise in signals of a received channel. In Equation (2), |Z[k]| means the signal intensity of total interference and noise received through a k-th symbol.

An application range of each Modulation and Coding Scheme (MCS) level may depend on the characteristic information value of the interference signal. For example, if the $\alpha$ value is 2 corresponding to a Gaussian interference channel, a MCS level may be allocated as in a typical data channel, whereas if the $\alpha$ value is smaller than 2 (for example, 1 or 0.5), this represents a non-Gaussian interference channel, and accordingly, a MCS level having higher transmission efficiency may be applied by applying a non-Gaussian decoding method.

Accordingly, in order to apply the characteristic, interference signals may need to be set and maintained such that interference between base stations comes close to a non-Gaussian interference channel, that is, such that the $\alpha$ value is small. For this, a FQAM data channel can be effectively used. However, if the $\alpha$ value cannot be accurately measured, an error may occur in accurately estimating a MCS level, which may lead to deterioration of system performance.

Accordingly, in the embodiments of the present disclosure, a method and device for maximizing the transmission efficiency of FQAM data by defining a channel capable of measuring characteristics information of an interference signal when receiving a FQAM signal, and proposing a method for satisfying requirements for the channel may be provided.

In the embodiments of the present disclosure, a channel for measuring characteristics information of an interference signal when receiving FQAM data is defined as a FQAM interference measurement channel.

Requirements for the FQAM interference measurement channel may be as follows.

First, a modulation characteristic of the FQAM interference measurement channel may need to be the same as that of a channel through which FQAM data is to be actually transmitted. For example, if adjacent cells transmit a FQAM signal having a 2FSK order in a FQAM data channel, the FQAM interference measurement channel may also have to transmit FQAM signals having the same 2FSK order.

Second, the channel allocation characteristics of interfering cells that transmit signals through a FQAM data channel may need to be reflected to the FQAM interference measurement channel. For example, if a specific base station transmits no signal in a FQAM data channel, that is, transmits a FQAM data channel in a blank state, the base station may also have to transmit no signal in the FQAM interference measurement channel. Otherwise, the characteristics of interference signals may become different between the FQAM data channel and the FQAM interference measurement channel, so that measuring FQAM interference signals may become meaningless, and transmission efficiency may also deteriorate.

Third, although the FQAM interference measurement channel combines signals from all base stations, each mobile station may need to identify a signal from its own serving base station and remove the signal. Since a FQAM interference measurement component is a metric that can be measured as a sum of noise and interference for each subcarrier, the mobile station may need to remove a signal from its own serving base station from a combination of signals from all base stations to calculate a power value, and then measure an interference signal based on the power value.

Hereinafter, a structure of a FQAM interference measurement channel and an interference measurement process, according to embodiments of the present disclosure will be described based on the requirements.

A channel for interference measurement may be needed to measure FQAM interference. Also, in order to acquire signals from interfering base stations except for signals from a desired base station from which data is desired to be received, from the entire reception signal intensity in a reference measurement channel, it is necessary to share a known sequence between the desired base station and a mobile station.

In an embodiment of the present disclosure, a sequence for the corresponding FQAM interference measurement channel may be transferred to the location of a signal on a frequency domain. Thus, since the sequence can represent the same signal format as data transmitted through a FQAM data channel, interference signals from adjacent base stations can be measured as the same results as when an interference signal characteristic information value for a FQAM data channel is measured.

Also, since the sequence represented by the location of the signal on the frequency domain is a sequence of a FSK format including unique information of a base station, a mobile station can distinguish the sequence of the corresponding base station. The unique information of the base station may be a base station IDentifier (BS ID) or a cell ID.

Also, the sequence represented by the location of the signal on the frequency domain may be defined as one of different sequences corresponding to individual FSK modulation orders so as to be defined as one of different sequence formats (that is, 2FSK format/4FSK format/8 FSK format) corresponding to the respective FQAM modulation orders, which will be described below in the following embodiment. Accordingly, the sequence can be used to estimate FSK modulation order information for a sub channel of a FQAM data channel of the corresponding frequency band, as well as the unique information of the base station.

FIG. 1 shows sequence allocation according to an embodiment of the present disclosure.

In FIG. 1, an example of converting a sequence "011011111110" representing BS ID and having a length of 12 to a signal format corresponding to 2FSK data area/4FSK data area/8FSK data area is shown. As such, in the current embodiment, a FQAM interference measurement channel may be configured with different formats of sequences on the frequency domain using FSK modulation orders corresponding to individual FQAM data channels, in order to measure an interference signal according to each FQAM data channel.

Table 1 is an example showing the sequence with respect to the entire cellular system. As seen in Table 1, different BS IDs may be defined for individual base stations according to FSK modulation orders so as to be used for FQAM interference measurement.

TABLE 1

|  | BS1 | BS2 | BS3 | . . . | BS$_N$ |
| --- | --- | --- | --- | --- | --- |
| 2FSK area | Seq. (2F, BS1) | Seq. (2F, BS2) | Seq. (2F, BS3) | . . . | Seq. (2F, BS$_N$) |
| 4FSK area | Seq. (4F, BS1) | Seq. (4F, BS2) | Seq. (4F, BS3) | . . . | Seq. (4F, BS$_N$) |
| 8FSK area | Seq. (8f, BS1) | Seq. (8F, BS2) | Seq. (8F, BS3) | . . . | Seq. (8F, BS$_N$) |

Figure 2:
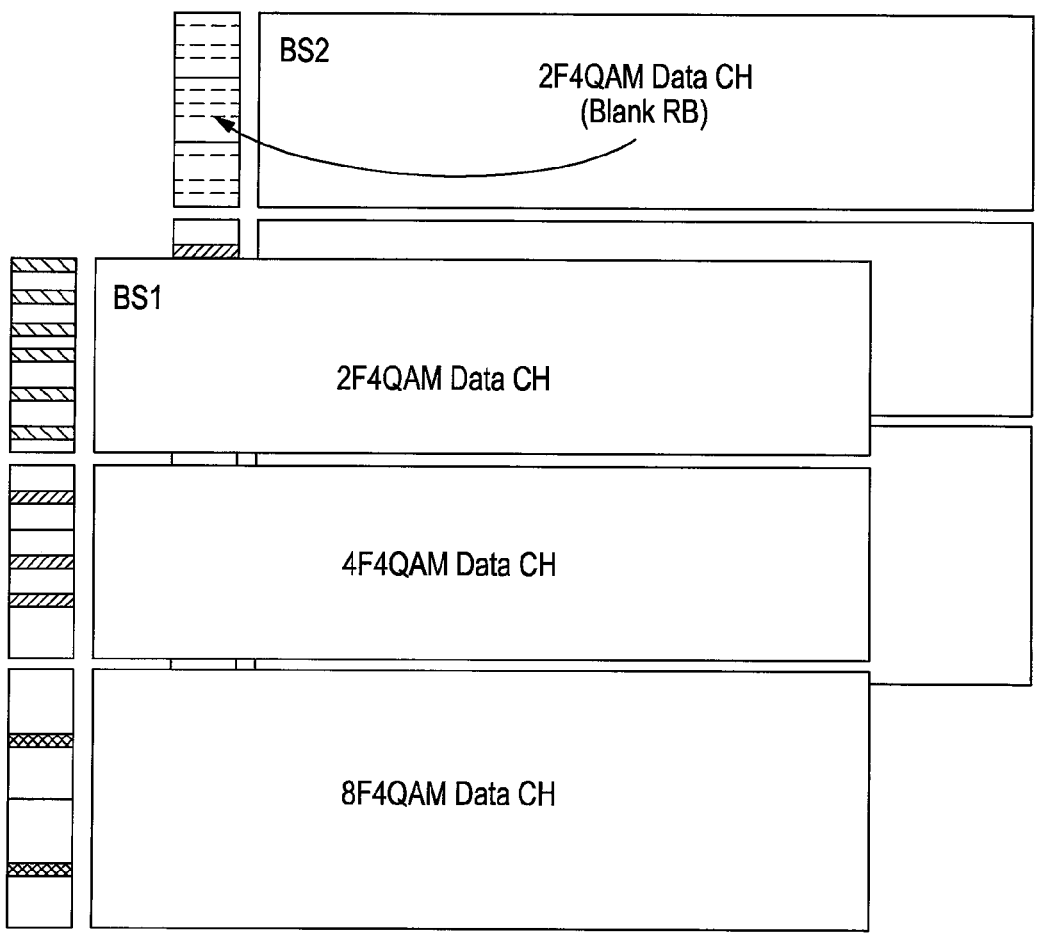
FIG. 2 shows a structure when the sequence is applied to a FQAM interference measurement channel.

FIG. 2 shows a structure when the sequence is applied to a FQAM interference measurement channel.

A serving base station and the adjacent base station belonging to the same area may apply the same FSK modulation order or a predetermined FSK modulation order to a FQAM data channel. For example, if the serving base station uses a FQAM data channel in the form of 2FSK area (2F4QAM), 4FSK area (4F4QAM), or 8FSK area (8F4QAM), the adjacent base station may also need to transmit a channel in which the same FSK modulation order is used in the same area. The reason is because an interference channel having a predetermined characteristic is assumed with respect to a resource area in which a specific FSK modulation order is used. Accordingly, as shown in FIG. 2, BS1 and BS2 may allocate a data channel of the same FSK modulation order to the same area.

A FQAM interference measurement channel existing separately from the FQAM data channel may have the same FSK modulation order as the FQAM data channel of the corresponding base station. For example, a FQAM interference measurement channel for a FQAM data area of the 2FSK area (2F4QAM) may be configured with a sequence having 2FSK which is the same FSK modulation order. Likewise, a FQAM interference measurement channel for a FQAM data area corresponding to the 4FSK area (4F4QAM) or the 8FSK area (8F4QAM) may also be configured with a sequence having 4FSK/8FSK which is the same FSK modulation order.

Also, if there is no data which the BS2 is to transmit through the FQAM data channel area of 2F4QAM of the BS2, the corresponding FQAM interference measurement channel of the BS2 may also transmit no sequence to thereby include the interference tendency of the FQAM data channel of the BS2.

Figure 3:
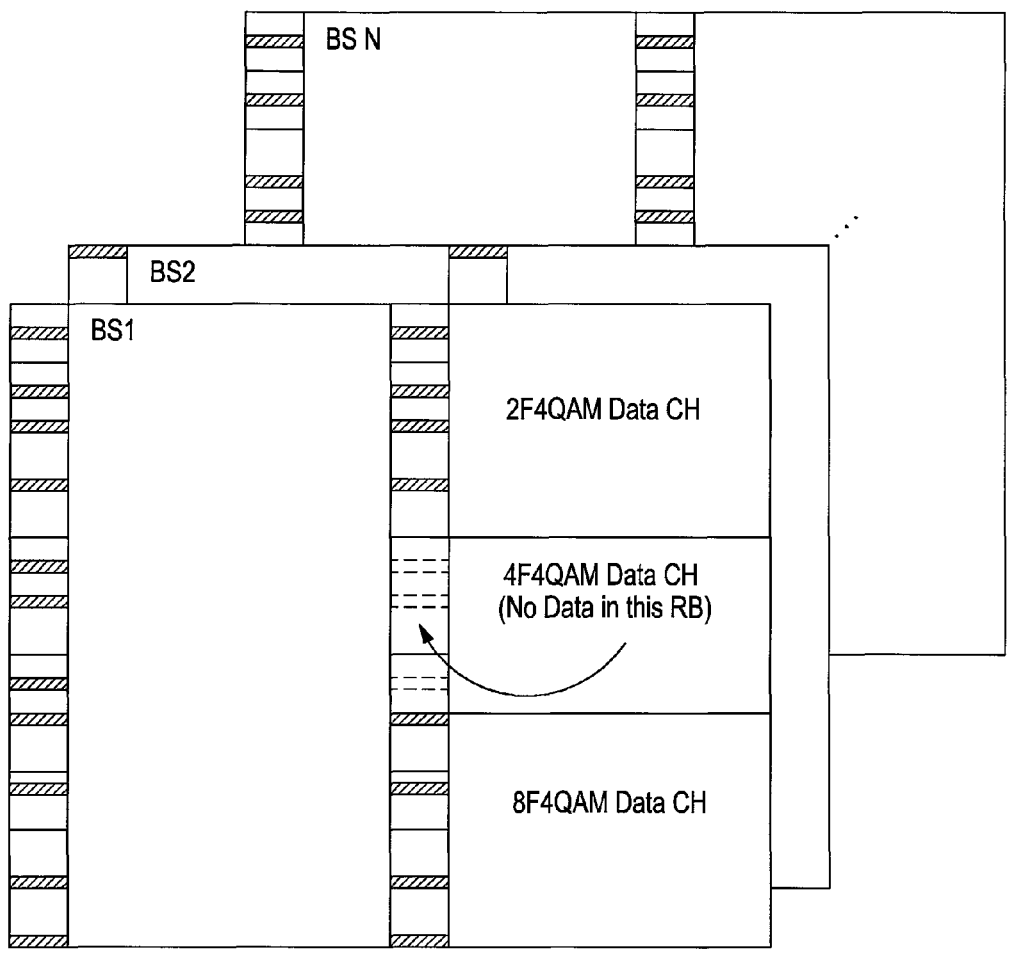
FIGS. 3 and 4 show a channel structure for transmitting a sequence for a FQAM interference measurement channel according to an embodiment of the present disclosure.
Figure 4:
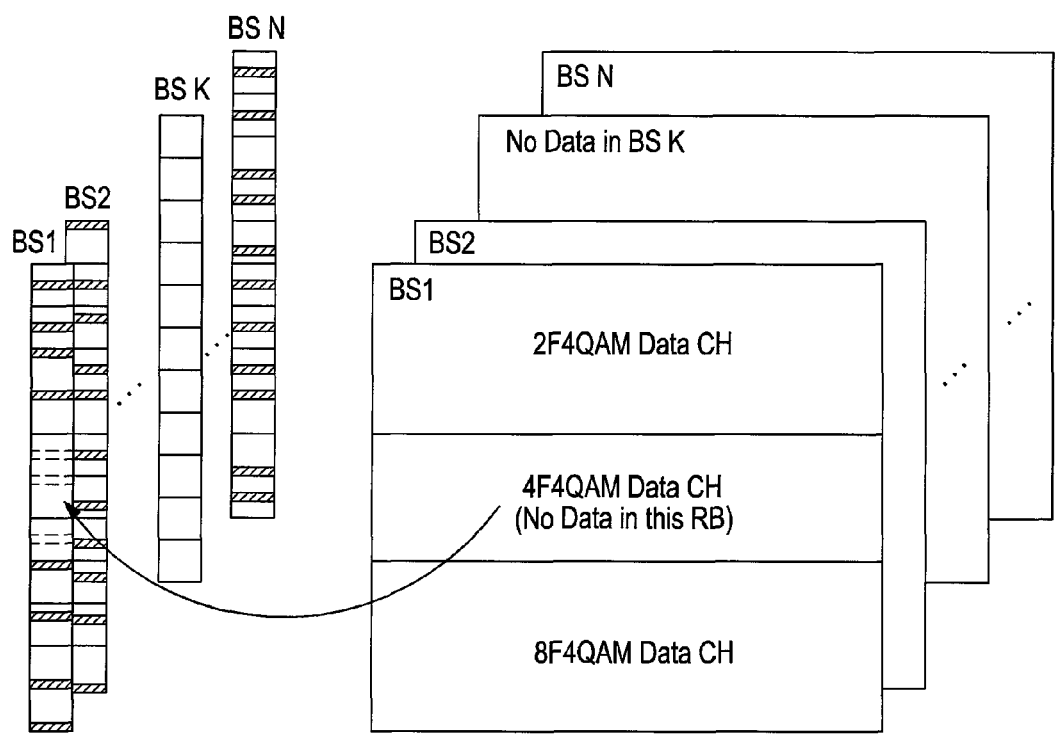

FIGS. 3 and 4 show a channel structure for transmitting a sequence for a FQAM interference measurement channel according to an embodiment of the present disclosure.

FIG. 3 shows a method of successively transmitting a FQAM interference measurement channel in the same frame as a FQAM data channel. In this case, since the FQAM interference measurement channel is adjacent to the data channel, a sequence of the FQAM interference measurement channel may be used for channel estimation.

FIG. 4 shows an example of configuring a FQAM interference measurement channel differently from a FQAM data channel. In this case, the FQAM interference measurement channel may be transmitted through an arbitrary frame before the FQAM data channel is transmitted. The FQAM interference measurement channel may include information about whether a resource is allocated to a FQAM data channel to be next transmitted. Accordingly, an interference characteristic for FQAM can be more accurately measured, so that the mobile station can estimate a MCS level more accurately.

Figure 5:
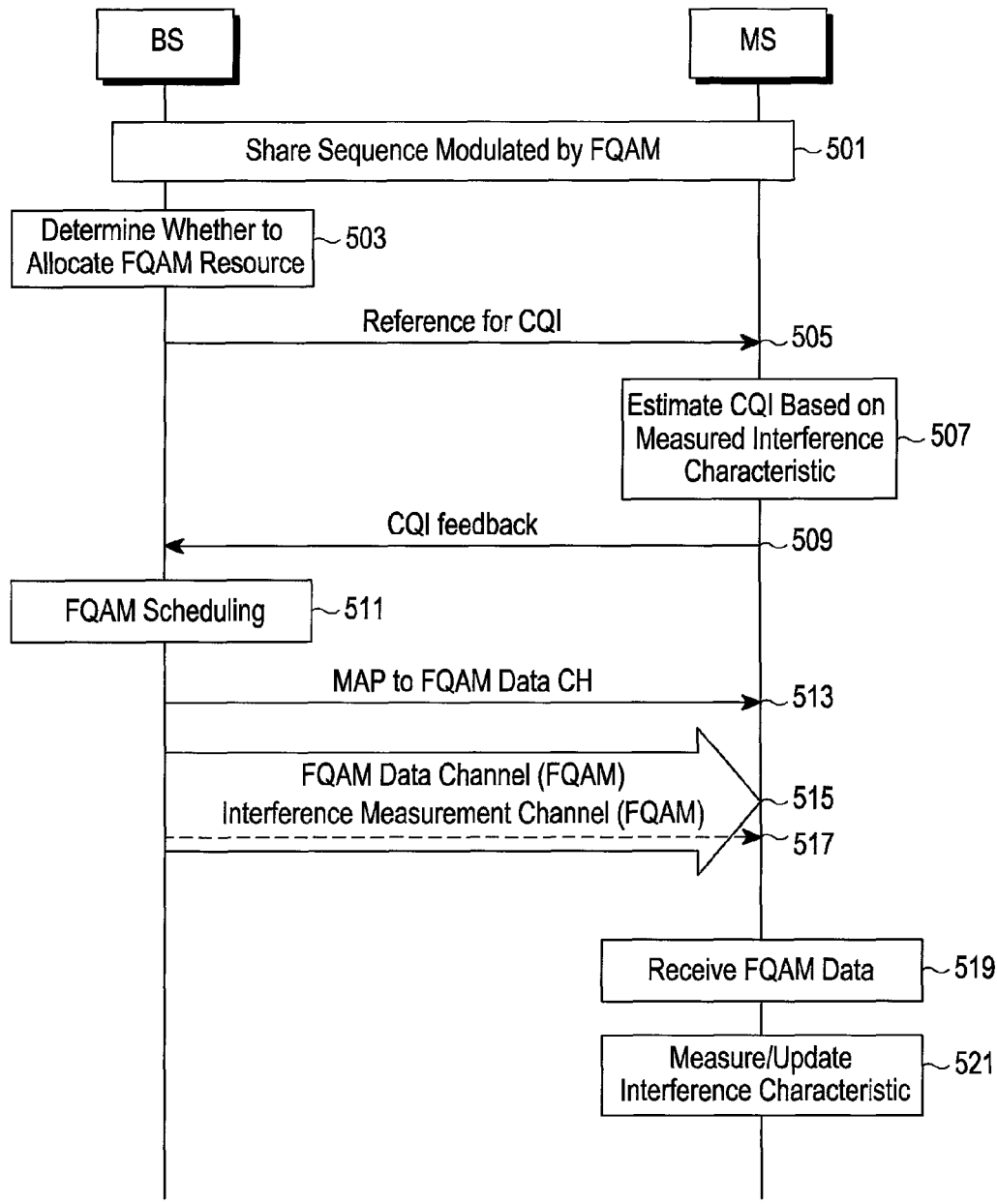
FIG. 5 is a flowchart illustrating an interference measurement method according to a FQAM interference measurement channel structure according to an embodiment of the present disclosure.

FIG. 5 is a flowchart illustrating an interference measurement method according to a FQAM interference measurement channel structure according to an embodiment of the present disclosure. FIG. 5 shows a case in which the FQAM interference measurement channel is successively transmitted in the same frame as a FQAM data channel.

Referring to FIG. 5, a base station BS may share a sequence of FQAM format for each FSK modulation order with a mobile station MS, in operation 501. Then, the base station BS may determine whether to allocate a FQAM resource area, in operation 503, and transmit a reference signal for estimating CQI to the mobile station MS, in operation 505. The reference signal may be transmitted through a legacy reference channel.

In FIG. 5, since a FQAM interference measurement channel is adjacent to a FQAM data channel, the mobile station MS can measure interference at the time when the FQAM data channel is transmitted. Accordingly, each mobile station MS may measure a FQAM interference characteristic value whenever the FQAM data channel is transmitted, and use the measured interference characteristic value to decide a CQI value for deciding a MCS level.

Accordingly, if the mobile station MS receives the reference signal from the base station BS, the mobile station MS may decide a CQI value for deciding an appropriate MCS level using the previously measured FQAM interference characteristic value, in operation 507, and feed the CQI value back to the base station BS, in operation 509. The mobile station MS may feed an average value of periodically measured CQI values back to the base station BS.

Thereafter, the base station BS may perform scheduling of mobile stations MS based on CQI values of the FQAM channel received from the mobile stations MS, in operation 511.

Then, the base station BS may transmit a MAP for the FQAM data channel, in operation 513, and then transmit the FQAM data channel, in operation 515. The mobile station MS may receive the FQAM data channel, in operation 519.

At this time, the base station BS may transmit a sequence to which allocation of the FQAM data channel and FSK modulation corresponding to a FSK modulation order of the FQAM data channel are applied, through a FQAM interference measurement channel, as described above, in operation 517. Accordingly, each mobile station MS may measure an interference characteristic value through the FQAM interference measurement channel to update the previously measured value, in operation 521.

Figure 6:
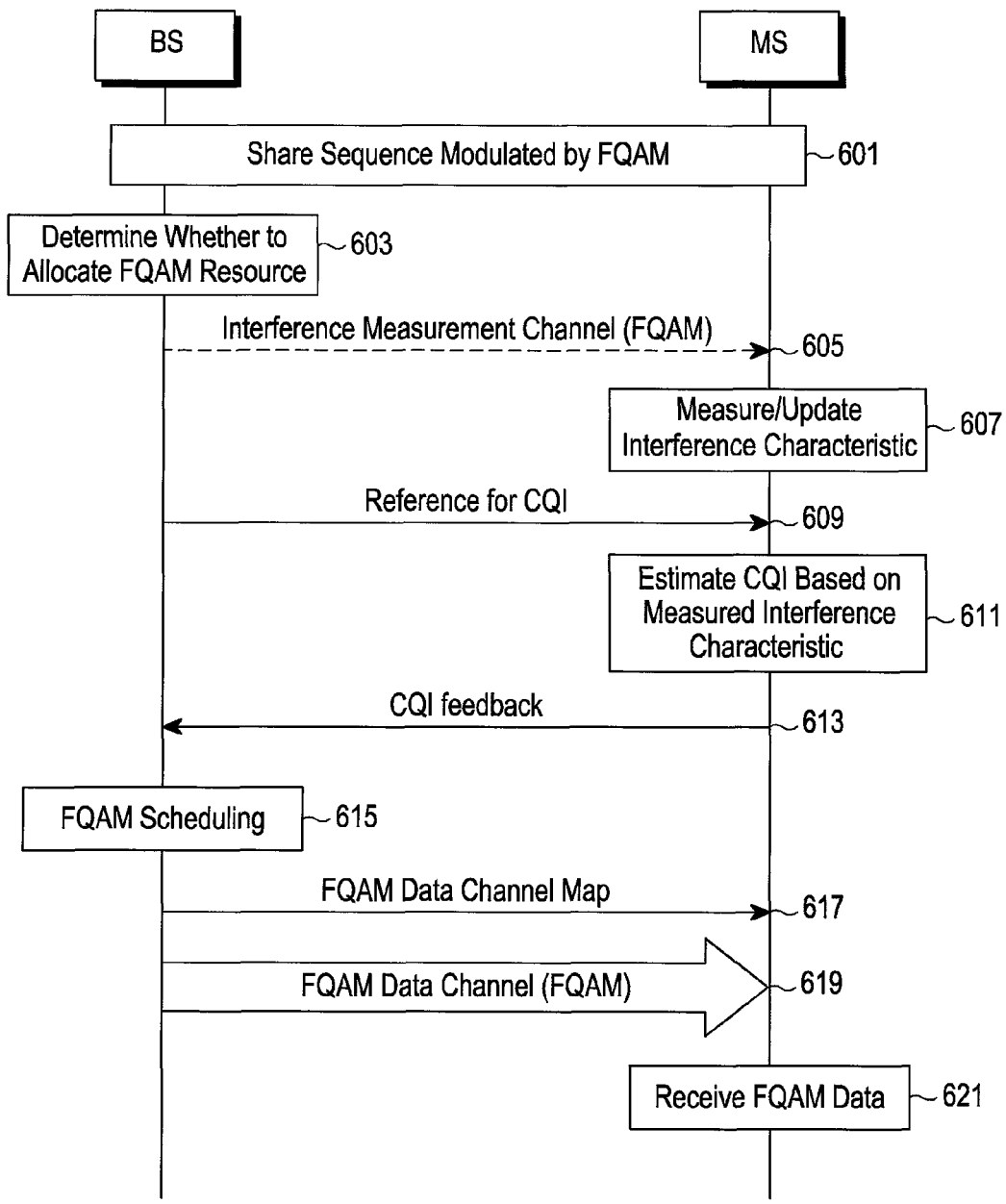
FIG. 6 is a flowchart illustrating an interference measurement method according to a FQAM interference measurement channel structure according to another embodiment of the present disclosure.

FIG. 6 is a flowchart illustrating an interference measurement method according to a FQAM interference measurement channel structure according to another embodiment of the present disclosure. FIG. 6 shows a case in which the FQAM interference measurement channel is transmitted in a frame that is different from a FQAM data channel.

Referring to FIG. 6, each base station BS may share a sequence of FQAM format for each FSK modulation order with a mobile station MS, in operation 601. Then, the base station BS may determine whether to allocate a FQAM resource area, in operation 603.

In FIG. 6, the base station BS may determine whether to allocate a FQAM resource area and whether to transmit FQAM data, and then determine whether to transmit a FQAM interference measurement channel, according to the results of the determination. Accordingly, if there is no mobile station MS to which the base station BS is to transmit FQAM data, the base station BS may transmit no FQAM interference measurement channel, whereas if the base station BS determines that FQAM data needs to be transmitted to a specific mobile station, the base station BS may transmit a FQAM interference measurement channel, in operation 605.

If the mobile station MS receives the FQAM interference measurement channel from the base station BS, the mobile station MS may measure a FQAM interference characteristic value from the corresponding channel, in operation 607. The base station BS may transmit a reference signal for estimating CQI to the mobile station MS, in operation 609. The base station BS may transmit the reference signal through a legacy reference channel. If the mobile station MS receives the reference signal from the base station BS, the mobile station MS may estimate a channel value of a desired base station BS based on the measured FQAM interference characteristic value and the reference signal, decide a CQI value for deciding a MCS level based on the estimated channel value of the desired base station BS, in operation 611, and then feed the CQI value back to the base station BS, in operation 613. At this time, the mobile station MS may feed an average value of periodically measured CQI values back to the base station BS.

If the base station BS receives the decided CQI value from the mobile station BS, the base station BS may perform scheduling based on the CQI value, and decide a mobile station MS to which the base station BS is to transmit data, in operation 615. Then, the base station BS may transmit FQAM data area allocation information of the corresponding mobile station MS through MAP, in operation 617, and then transmit FQAM data through the corresponding data channel, in operation 619. Then, the mobile station MS may receive the FQAM data, in operation 621.

Figure 7:
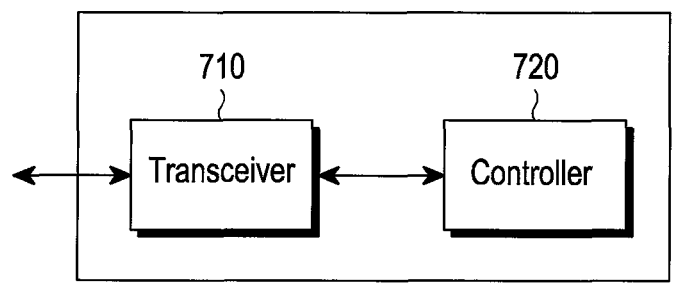
FIG. 7 shows a base station according to an embodiment of the present disclosure.

FIG. 7 shows a base station according to an embodiment of the present disclosure.

Referring to FIG. 7, the base station may include a transceiver 710 and a controller 720. The controller 720 may perform operation of determining whether to allocate a FQAM resource and whether to transmit data and scheduling a mobile station, and control operation for transmitting a data channel and an interference channel to the mobile station according to the results of the determination. The transceiver 710 may perform overall operations for transmitting/receiving a signal according to an embodiment of the present disclosure to/from the mobile station, under the control of the controller 720.

Figure 8:
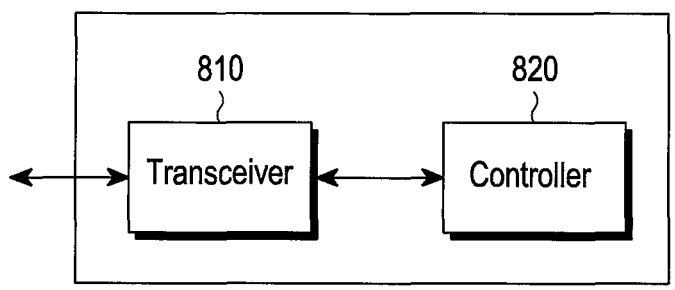
FIG. 8 shows a mobile station according to an embodiment of the present disclosure.

FIG. 8 shows a mobile station according to an embodiment of the present disclosure.

Referring to FIG. 8, the mobile station may include a transceiver 810 and a controller 820. The controller 820 may perform operation of measuring an interference characteristic and estimating CQI according to the measured interference characteristic, according to an embodiment of the present disclosure, and control operation for transmitting CQI to a base station. The transceiver 810 may perform operation of receiving a data channel and an interference measurement channel according to an embodiment of the present disclosure from a base station, and transmitting CQI to which an interference characteristic is reflected to the base station, under the control of the controller 820.

According to embodiments of the present disclosure, interference patterns for FQAM data transmission can be more accurately measured by configuring an interference measurement channel for each FSK modulation order, and enabling a mobile station to measure interference signal characteristics information using an interference measurement channel having the same modulation order as a FQAM data channel and to feed the interference signal characteristics information back to a base station. Also, the base station can select an accurate MCS level in consideration of channel characteristics based on the information fed back from the mobile station.

One of persons skilled in the art would be able to understand that it is possible to have other forms of embodiment without modifying the technical concept or essential features of the present disclosure. Thus, in all aspects, the embodiments described above are to be understood as exemplar and not restrictive.

In the specification and drawings, there have been set forth preferred, embodiments of the present disclosure, and, although specific terms are employed, they are used in a generic and descriptive sense only and not for purposes of limitation. Another modification based on the technical concept of the present disclosure, in addition to the embodiments disclosed herein is that they can be carried out, it will be apparent to those of ordinary skill in the art.

The invention claimed is:

1. A method of transmitting data in a wireless communication system, comprising:
   allocating, by a base station, a resource for transmitting data modulated by a hybrid frequency shift keying (FSK) and quadrature amplitude modulation (QAM) (FQAM) scheme in which a QAM scheme and a FSK scheme are combined;
   transmitting, by the base station, a sequence modulated by the FQAM scheme, to a mobile station, via an interference measurement channel;
   transmitting, by the base station, a reference signal for measuring channel quality information (CQI) to the mobile station;
   receiving, by the base station, CQI estimated based on an interference characteristic of the interference measurement channel, from the mobile station, and performing scheduling of the mobile station based on the received CQI; and
   transmitting, by the base station, the data modulated by the FQAM scheme to the mobile station.

2. The method of claim 1, wherein the sequence is transmitted in the same frame as the data, the sequence being adjacent to the data.

3. The method of claim 1, wherein the sequence is transmitted before the data is transmitted.

4. The method of claim 1, wherein the sequence includes identification information of the base station and is shared between the base station and the mobile station, and
   wherein the sequence is represented as a signal on a frequency domain and a format of the sequence is based on modulation order of the FQAM scheme.

5. The method of claim 1, wherein if there is data to be transmitted to the mobile station, the base station transmits the sequence via the interference measurement channel.

6. A method of receiving data in a wireless communication system, comprising:
   receiving, by a mobile station, a sequence modulated by a hybrid frequency shift keying (FSK) and quadrature amplitude modulation (QAM) (FQAM) scheme in which a QAM scheme and a FSK scheme are combined, from a base station, via an interference measurement channel, and measuring an interference characteristic based on the sequence;
   receiving, by the mobile station, a reference signal for measuring channel quality information (CQI) from the base station;
   estimating, by the mobile station, CQI based on the measured interference characteristic, and transmitting the estimated CQI to the base station; and
   receiving, by the mobile station, data modulated by the FQAM scheme from the base station.

7. The method of claim 6, wherein the sequence is received in the same frame as the data, the sequence being adjacent to the data.

8. The method of claim 6, wherein the sequence is received, before the data is received.

9. The method of claim 6, wherein the sequence includes identification information of the base station and is shared between the base station and the mobile station, and
   wherein the sequence is represented as a signal on a frequency domain and a format of the sequence is based on modulation order of the FQAM scheme.

10. The method of claim 6, wherein if there is data to be received from the base station, the mobile station the sequence via the interference measurement channel.

11. A device of transmitting data in a wireless communication system, comprising:
    a controller configured to:
      allocate a resource for transmitting data modulated by a hybrid frequency shift keying (FSK) and quadrature amplitude modulation (QAM) (FQAM) scheme in which a QAM scheme and a FSK scheme are combined;
      transmit a sequence modulated by the FQAM scheme to a mobile station, via an interference measurement channel;
      transmit a reference signal for measuring channel quality information (CQI) to the mobile station;
      receive CQI estimated based on an interference characteristic of the interference measurement channel from the mobile station;
      perform scheduling of the mobile station based on the received CQI; and
      transmit data modulated by the FQAM scheme to the mobile station; and
    a transceiver configured to transmit the sequence and the reference signal, to receive the CQI from the mobile station, and to transmit the data modulated by the FQAM scheme to the mobile station, under the control of the controller.

12. The device of claim 11, wherein the sequence is transmitted in the same frame as the data, the sequence being adjacent to the data.

13. The device of claim 11, wherein the sequence is transmitted, before the data is transmitted.

14. The device of claim 11, wherein the sequence includes identification information of the base station and is shared between the base station and the mobile station, and wherein the sequence is represented as a signal on a frequency domain and a format of the sequence is based on modulation order of the FQAM scheme.

15. The device of claim 11, wherein if there is data to be transmitted to the mobile station, the base station transmits the sequence via the interference measurement channel.

16. A device of receiving data in a wireless communication system, comprising:

a controller configured to:

receive a sequence modulated by a hybrid frequency shift keying (FSK) and quadrature amplitude modulation (QAM) (FQAM) scheme in which a QAM scheme and a FSK scheme are combined, from a base station, via an interference measurement channel;

measure an interference characteristic based on the sequence;

receive a reference signal for measuring channel quality information (CQI) from the base station;

estimate CQI based on the measured interference characteristic;

transmit the estimated CQI to the base station; and receive data modulated by the FQAM scheme from the base station; and a transceiver configured to receive the reference signal for measuring the CQI from the base station, to transmit the estimated CQI to the base station, and to receive the data modulated by the FQAM scheme from the base station, under the control of the controller.

17. The device of claim 16, wherein the sequence is received in the same frame as the data, the sequence being adjacent to the data.

18. The device of claim 16, wherein the sequence is received, before the data is received.

19. The device of claim 16, wherein the sequence includes identification information of the base station and is shared between the base station and a mobile station, and wherein the sequence is represented as a signal on a frequency domain and a format of the sequence is based on modulation order of the FQAM scheme.

20. The device of claim 16, wherein if there is data to be received from the base station, a mobile station receives the sequence via the interference measurement channel.

\* \* \* \* \*